United States Patent
Yoshida

(10) Patent No.: US 10,209,870 B2
(45) Date of Patent: *Feb. 19, 2019

(54) COMPUTER READABLE MEDIUM AND APPARATUS

(71) Applicant: Brother Kogyo Kabushiki Kaisha, Nagoya-shi, Aichi-ken (JP)

(72) Inventor: Akiji Yoshida, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 418 days.

This patent is subject to a terminal disclaimer.

(21) Appl. No.: 14/967,517

(22) Filed: Dec. 14, 2015

(65) Prior Publication Data

US 2016/0098179 A1    Apr. 7, 2016

Related U.S. Application Data

(63) Continuation of application No. 13/367,748, filed on Feb. 7, 2012, now Pat. No. 9,213,470.

(30) Foreign Application Priority Data

Feb. 7, 2011   (JP) .................................. 2011-024127

(51) Int. Cl.
  *G06F 3/048*  (2013.01)
  *G06F 3/0484*  (2013.01)
  *H04L 29/08*  (2006.01)

(52) U.S. Cl.
  CPC ........ *G06F 3/04842* (2013.01); *G06F 3/0484* (2013.01); *H04L 67/02* (2013.01)

(58) Field of Classification Search
  CPC ............... G06F 17/211; G06F 17/2229; G06F 17/2288; G06F 17/30896; G06F 17/3089;
  (Continued)

(56) References Cited

U.S. PATENT DOCUMENTS 5,581,686 A   12/1996  Koppolu et al.
6,222,637 B1   4/2001  Ito et al.
(Continued)

FOREIGN PATENT DOCUMENTS

JP   HEI11-250054 A    9/1999
JP   2002-351636 A    12/2002
(Continued)

OTHER PUBLICATIONS

William Smith, "Customize Word 2011's Ribbon and Enable More Features", published: Nov. 7, 2010, pp. 1-4 (Year: 2010).*
(Continued)

*Primary Examiner* — Wilson W Tsui
(74) *Attorney, Agent, or Firm* — Banner & Witcoff, Ltd.

(57) ABSTRACT

Various areas of a displayed document (e.g., text, image, etc.) may be selected and clipped as a separate document. In some arrangements, a user may wish to change the area of the clipped area without having to retrieve the displayed document again. Accordingly, the area of the clipped region may be modified by retrieving and storing the displayed document when the region is initially clipped. When the selected region is to be modified at a later time, the stored document may be used instead of having to retrieve the document from a source location.

11 Claims, 26 Drawing Sheets

(58) Field of Classification Search
CPC ......... G06F 17/30265; G06F 17/30884; G06F 3/0484; G06F 3/04842
See application file for complete search history.

(56) References Cited

U.S. PATENT DOCUMENTS

| | | |
|---|---|---|
| 6,944,821 B1 | 9/2005 | Bates et al. |
| 7,734,058 B1 | 6/2010 | Adams et al. |
| 7,962,846 B2 | 6/2011 | Lerner et al. |
| 8,468,441 B2 | 6/2013 | Cory |
| 9,626,383 B2 * | 4/2017 | Wallace .............. G06F 17/3028 |
| 2002/0135806 A1 | 9/2002 | Yoshino |
| 2006/0177132 A1 | 8/2006 | Jackson et al. |
| 2007/0266342 A1 * | 11/2007 | Chang ............... G06F 17/30867 715/810 |
| 2008/0307308 A1 * | 12/2008 | Sullivan ............ G06F 17/30905 715/723 |
| 2009/0109337 A1 | 4/2009 | Imai et al. |
| 2009/0202179 A1 | 8/2009 | Shivanna et al. |
| 2010/0195131 A1 | 8/2010 | Nakata |
| 2010/0306679 A1 * | 12/2010 | Wu ................... G06F 17/30884 715/760 |
| 2011/0035659 A1 | 2/2011 | Matsumoto |
| 2011/0221764 A1 * | 9/2011 | Callens ................ G06F 9/4443 345/625 |
| 2014/0250363 A1 * | 9/2014 | Wichmann ............... G06F 8/30 715/234 |

FOREIGN PATENT DOCUMENTS

| | | |
|---|---|---|
| JP | 2007094950 A | 4/2007 |
| JP | 2010-181971 A | 8/2010 |
| JP | 2011013770 A | 1/2011 |
| WO | 2007111330 A1 | 10/2007 |

OTHER PUBLICATIONS

Notice of Reasons for Rejection issued in corresponding Japanese Patent Application 2011-024127 dated Feb. 5, 2013.

* cited by examiner

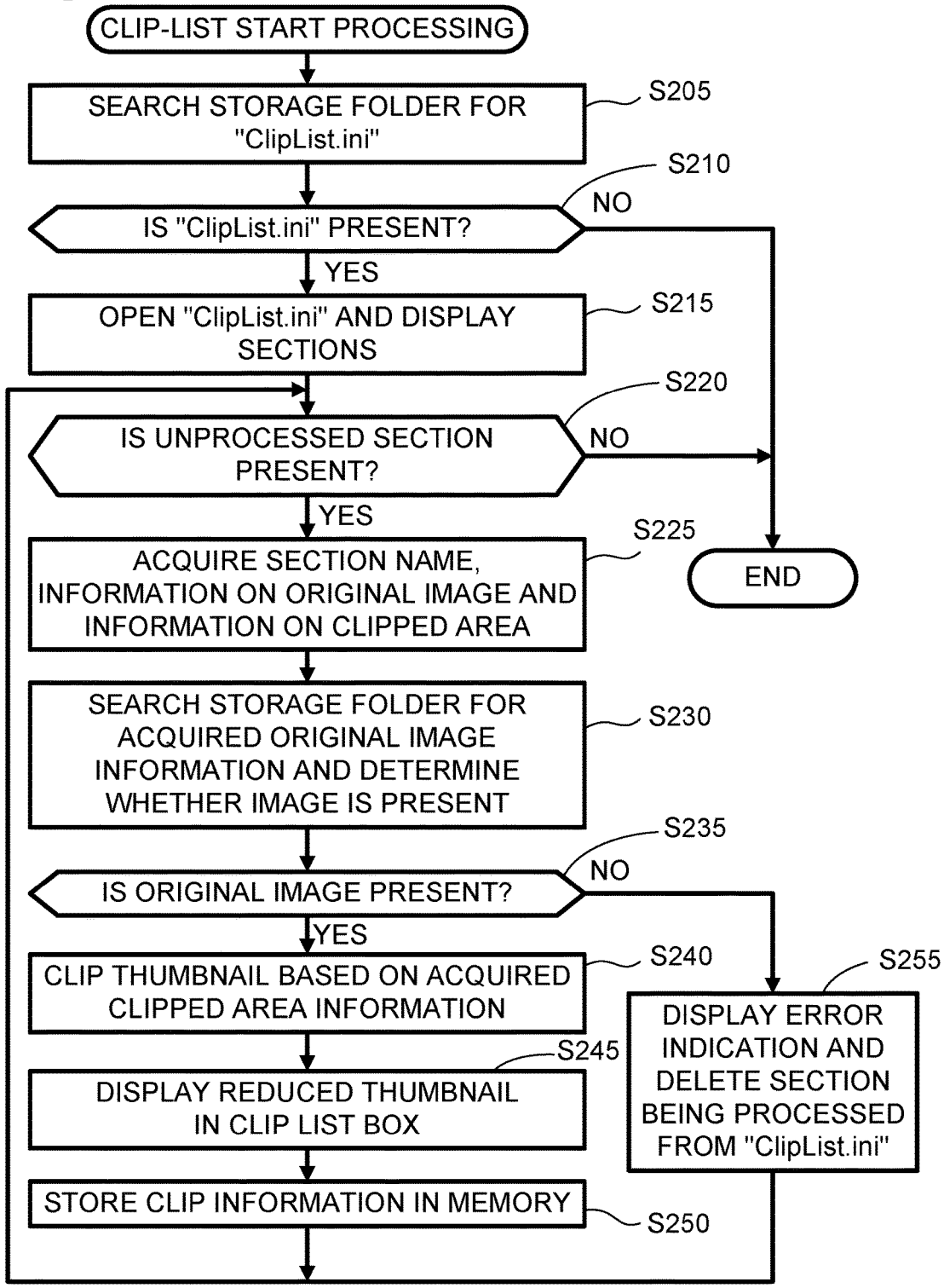

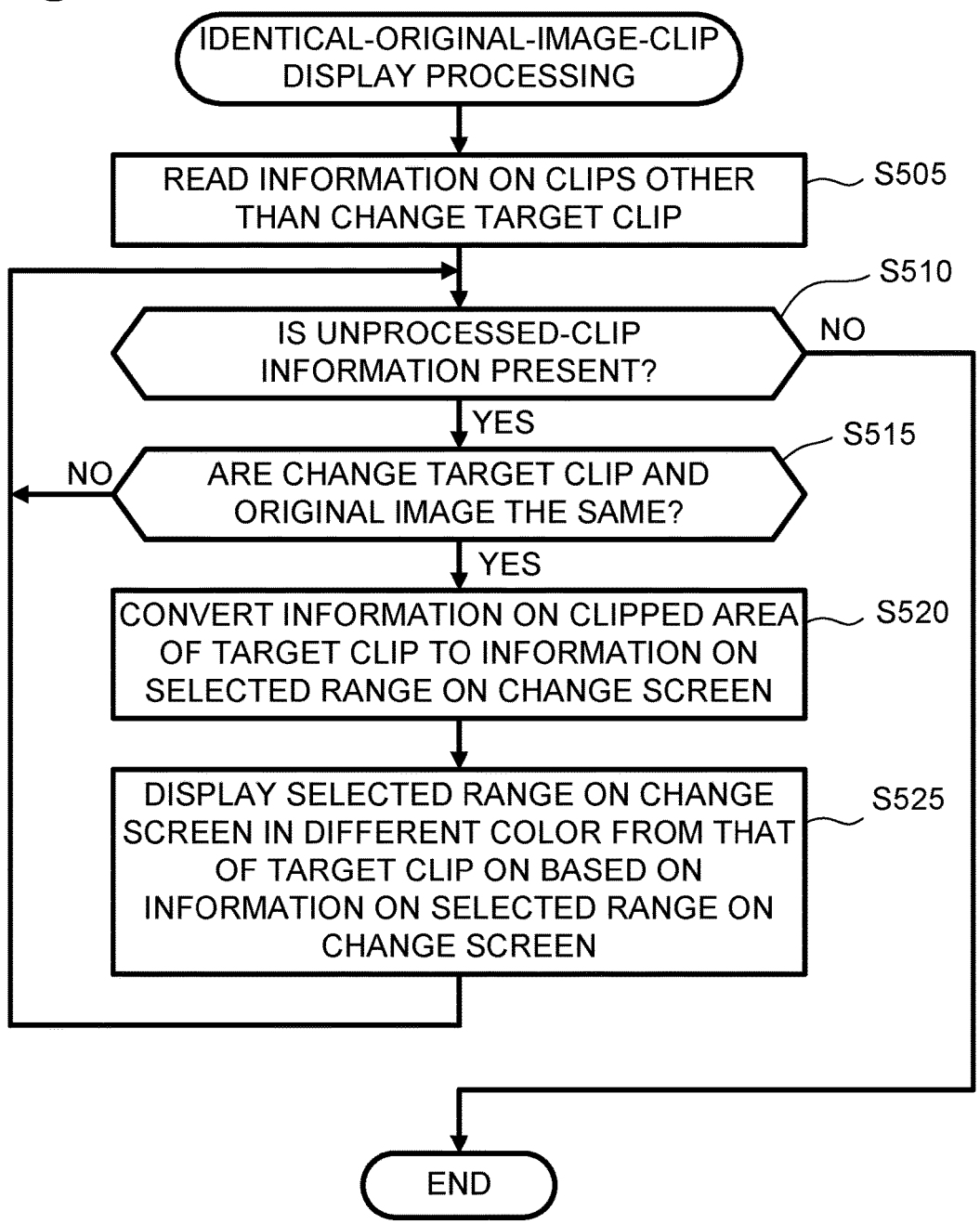

COMPUTER READABLE MEDIUM AND APPARATUS

CROSS REFERENCE TO RELATED APPLICATION

This application is a Continuation of U.S. patent application Ser. No. 13/367,748 filed Feb. 7, 2012, which claims priority from Japanese Patent Application No. 2011-024127, filed on Feb. 7, 2011, the entire disclosures of which are incorporated herein by reference.

BACKGROUND

Techniques for clipping a desired area on a Web page, when the operation of selecting the area is performed, and printing or storing the clipped selected area are known.

BRIEF SUMMARY

However, in the related art, a selected area, once clipped, cannot be changed even if desired. The user typically must open the same Web page again and change the desired selected area, which may require additional time and labor.

Aspects described herein provide a system, apparatus and function that allows a desired selected area to be clipped from a document such as a Web page and to be stored. Additionally, the systems, apparatuses and functions allow the range of the clipped selected area to be freely changed even after clipping.

According to one aspect, systems, apparatuses, methods and computer readable media for displaying a document such as a Web page on a display are provided. The systems, apparatuses, methods and computer readable media may provide acceptance of a selection of an area (e.g., a partial area) of the displayed document as a selected area; storage of selected-area information indicating the range of the selected area and document data indicating the document in a storage unit in association with each other; acceptance of a selected-area change instruction to change the range of the selected area; and, when the change-instruction is received/accepted, changing of the range of the selected area that the selected-area information stored in the storage unit indicates to the range of the selected area designated by the selected-area change instruction.

According to another aspect, extraction of a selected image displayed in the range of the selected area indicated by the selected-area information from the document that the document data stored in the storage unit indicates and displays the selected image may be provided.

Other objects, features, and advantages will be apparent to persons of ordinary skill in the art from the following description with reference to the accompanying drawings.

BRIEF DESCRIPTION OF THE DRAWINGS

FIG. 3A is a flowchart illustrating an example clip-list start processing;

FIG. 5A is a flowchart illustrating an example identical-original-image-clip display processing;

DETAILED DESCRIPTION

An embodiment will be described by way of examples.
System Configuration

Figure 1:
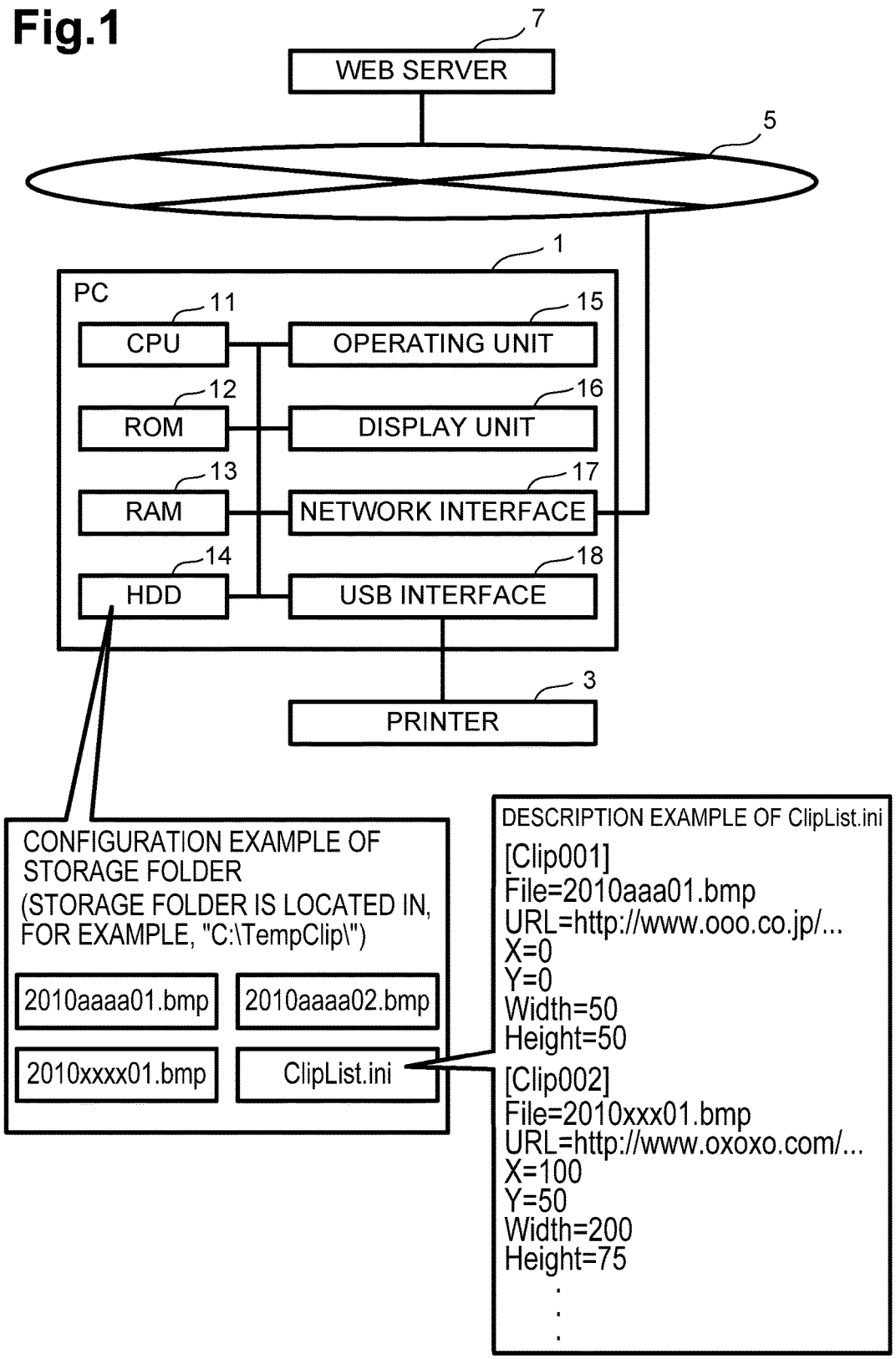
FIG. 1 is a block diagram illustrating an example configuration of a system including a computing device and a printer.

As illustrated in FIG. 1, a system described below includes a personal computer 1 (hereinafter referred to as a PC 1) and a printer 3 connected to the PC 1. The PC 1 can communicate with a web server 7 via a WAN (wide area network, for example, the Internet) 5.

As illustrated in FIG. 1, the PC 1 includes a processor or controller such as CPU 11, ROM 12, RAM 13, HDD 14 (hard disk drive 14), operating unit 15, display unit 16, network interface 17, and USB interface 18.

The HDD 14 stores various software (e.g., including computer readable instructions), such as an OS (operating system), a web browser, described later, and a plug-in installed in the web browser. When processing based on these programs is executed by the CPU 11, the programs are read into the RAM 13.

The HDD 14 stores imaged Web pages and information on clip ranges in the Web pages. For example, the data is stored in a folder having a specific path name that is determined in advance (for example, "C:\TempClip\" illustrated in FIG. 1).

The imaged Web pages are stored such that one Web page is stored in one bitmapped image file (for example, "2010aaaa01.bmp" illustrated in FIG. 1). Other image formats may also be used.

For the information indicating clip ranges in the Web pages, such information on a plurality of clips may, in some configurations, be stored in a single text file (for example, "ClipList.ini" illustrated in FIG. 1). For example, the text file stores information on a plurality of sections corresponding to the clips, as illustrated in FIG. 1. Each section stores the file name of the bitmapped image file and coordinates indicating the clip range in association with each other.

The operating unit 15 includes a keyboard and various pointing devices (for example, a mouse). The display unit 16 includes a liquid crystal display.

In the thus-configured PC 1, the web browser can be activated through user's operation on the operating unit 15. After the web browser is activated, the URL (uniform resource locator) of Web page data on the web server 7 (for example, markup document data described in hypertext markup language (HTML), extensible HTML (XHTML), or extensible markup language (XML)) through user's operation on the operating unit 15, and a request to acquire data can be issued to the web server 7.

When the request is received by the web server 7, the web server 7 returns Web page data as a response. Thus, the PC 1 acquires the Web page data and displays the Web page on the display unit 16.

If an instruction to print the Web page is issued through user's operation on the operating unit 15 after the Web page is displayed on the display unit 16, the PC 1 can print the Web page with the printer 3 by controlling the printer 3.

The PC 1 has the function of clipping part of the Web page displayed on the web browser and printing or storing the clip (hereinafter also referred to as a clip function), which will be described later in detail.

Using the clip function allows the user to clip a desired range from the Web page displayed on the web browser by designating the range (e.g., coordinates defining a section of the web page), thus allowing the clip to be printed and also allowing the clip to be stored and to be printed later.

Processing Executed by PC

Processing executed by the PC 1 will be described with reference to the examples processes illustrated in the flowcharts of FIGS. 2 to 7.

The web browser in the PC 1 is configured such that various extensions other than standard or pre-loaded functions can be added by installing programs called plug-ins. The following processes are also achieved by the CPU 11 executing a process as a web browser and a process as a plug-in installed in the web browser in cooperation of both processes.

Figure 8A:
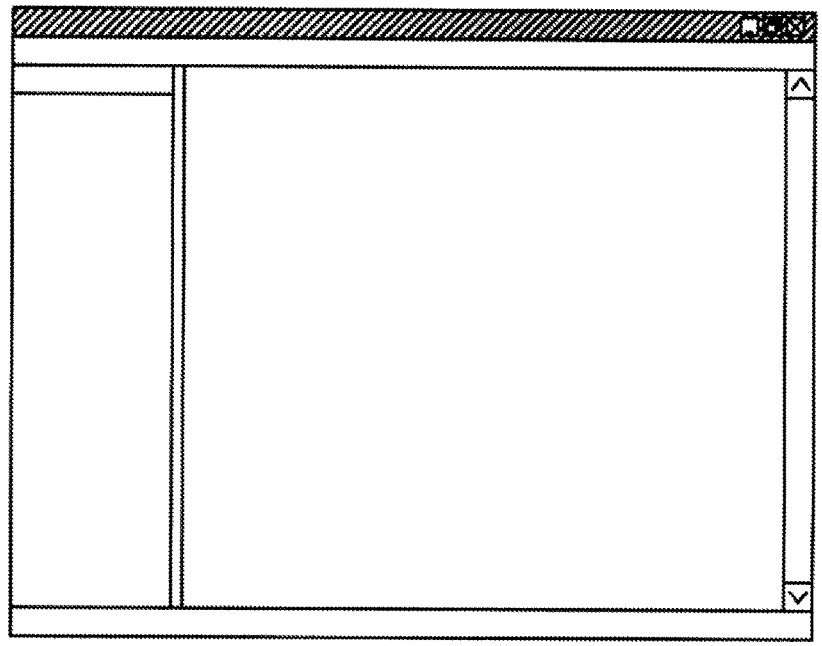
FIG. 8A is an explanatory diagram illustrating an example of a display area of a web browser.
Figure 8B:
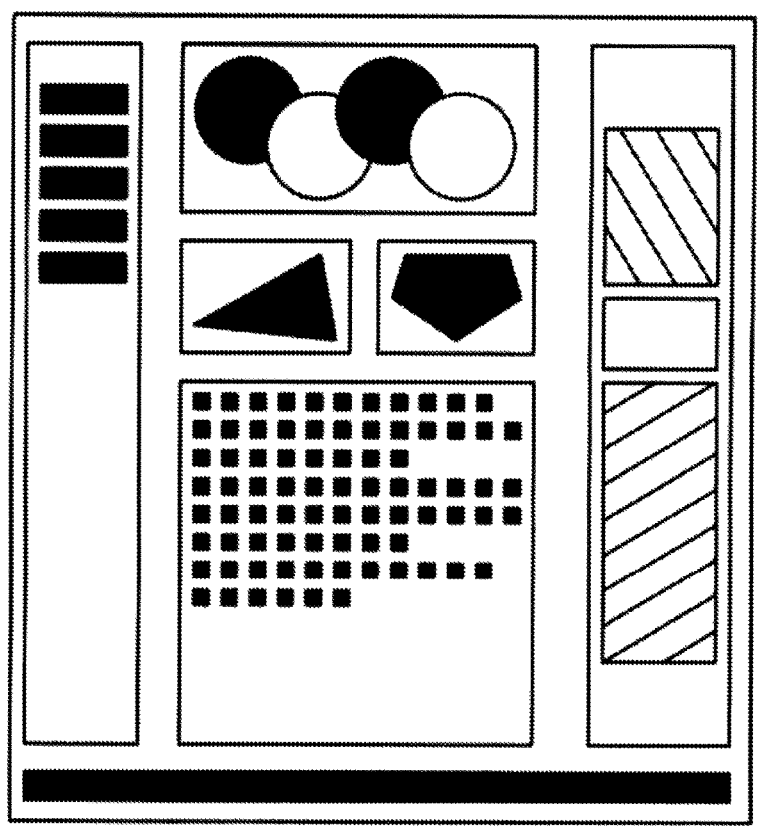
FIG. 8B is an explanatory diagram illustrating an example of a Web page.

In the following description, processing executed by the PC 1 will be described, using display examples as appropriate, on the assumption that a Web page illustrated in FIG. 8B is displayed on a web browser with the screen configuration illustrated in FIG. 8A. In the following description, expressions, such as click, right-click, drag, mouse-down, and mouse-up, are used assuming a general operation using a pointing device as an operation on the operating unit 15; an alternative operation that allows the same functions to be achieved may be performed using other input devices, such as a keyboard and a tablet, and types of input available there through. Other documents and document applications, functions and software may be used.

Figure 2:
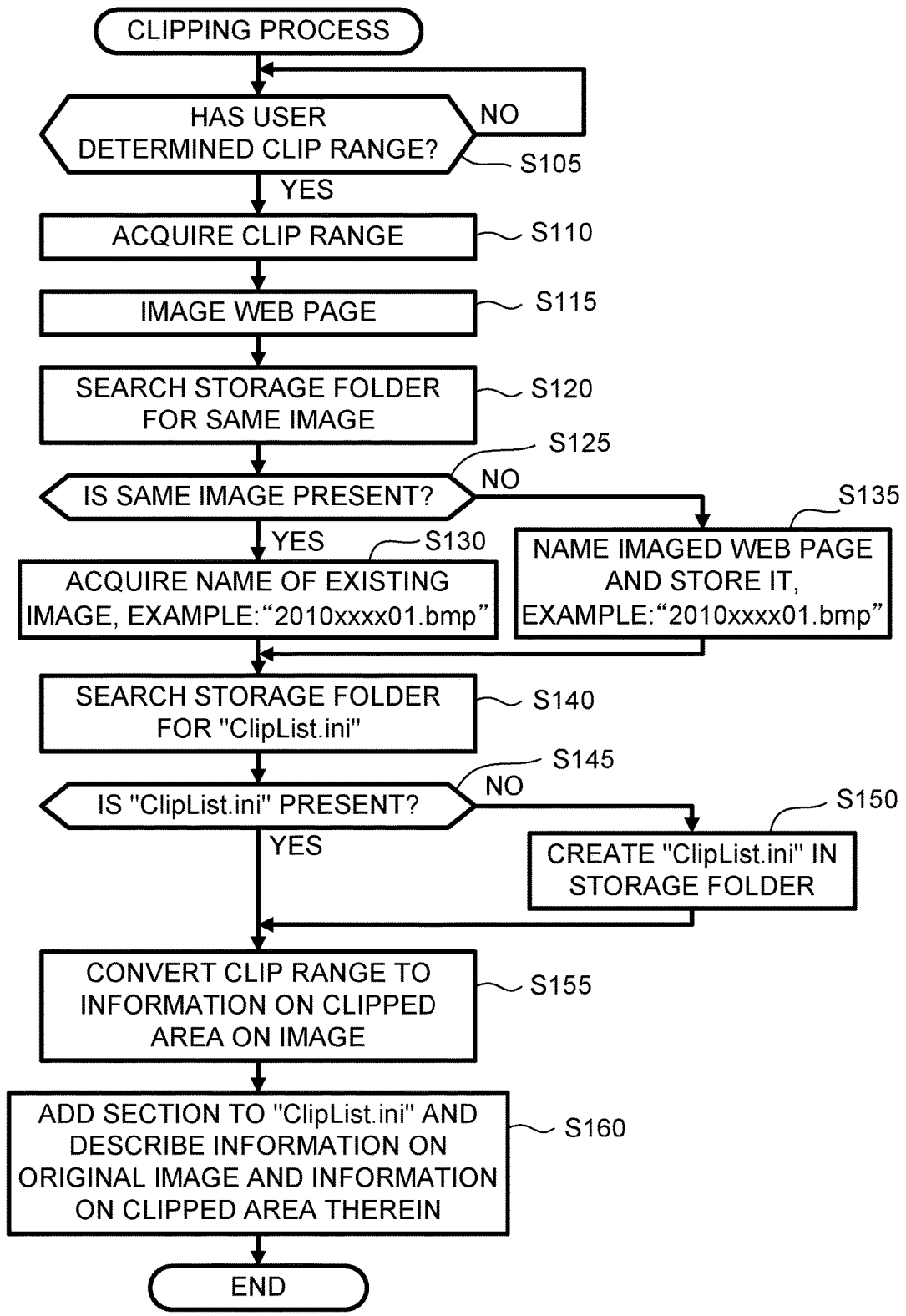
FIG. 2 is a flowchart illustrating an example clipping process.

An example clipping process will be described with reference to FIG. 2. The clipping process is executed when a range that the user designates on a Web page (e.g., a sub-section of a web page less than or equal to the entire web page) is to be stored as a clip. The clipping process is started when the web browser is activated.

When the clipping process is started, the PC 1 waits until the user determines a clip range (S105: NO). In this state, the user performs a predetermined operation to shift to a clip-range designation mode and thereafter designate two points corresponding to both ends of a diagonal line of a desired rectangular range (or sub-section) on the Web page, thereby designating the rectangular range as a clip range.

Of the two points corresponding to both ends of the diagonal line, the first point can be designated by executing a mouse-down operation on the Web page, and the second points can be designated by executing a drag operation subsequent to the designation of the first point and then executing a mouse-up operation. During the drag operation, a frame indicating the clip range is displayed on the web browser, as indicated by the broken line in FIG. 8C. This allows the user to adjust the clip range using the displayed frame as a guide. Other shapes, coordinates, and/or number of points or coordinates may be used to define a selection range for the clip as desired.

If a mouse-up operation has been performed, the PC 1 determines that the user has determined a clip range (S105: YES) and acquires the clip range (S110). In S110, the PC 1 analyzes what range on the Web page has been designated on the basis of the data structure of the Web page, the resolution (display size) of the display screen, etc. and acquires that information. Known algorithms and processes may be used to analyze the range.

Subsequently, the PC 1 images the Web page (S115). In S115, the entire Web page is imaged irrespective of the position and size of the clip range that the user has designated. Imaging the web page may include downloading and/or storing an image of the web page at PC 1 (in contrast to storing the web page itself). In some examples, the web page (e.g., the HTML or other web page format documents) may be downloaded and stored. The PC 1 searches the storage folder for the same image (S120). In S120, if the same Web page was imaged in the past, the same image is extracted from the storage folder.

If the PC 1 determines that the same image is stored (S125: YES), there is no need to store the same image again, and thus, the PC 1 acquires the name of the stored existing image (S130). For example, if the file name of the stored existing image is "2010xxxx01.bmp", the file name is acquired.

On the other hand, if the same image is not present (S125: NO), the PC 1 names the imaged Web page and stores it (S135). The name is given in accordance with predetermined rules; for example, a file name, "2010xxxx01.bmp", is given.

After S130 or S135 is finished, the PC 1 searches the storage folder for "ClipList.ini" (S140). For example, the file "ClipList.ini" may be present if clip storage was performed in the past (S145: YES), and thus, the PC 1 may move to S155.

On the other hand, if clip storage is performed for the first time, "ClipList.ini" is not present (S145: NO), and thus, the PC 1 creates "ClipList.ini" in the storage folder (S150) and moves to S155.

In S155, the clip range is converted to information on the clipped area on the image (S155). Since the coordinates of the clip range on the image is thus determined, a section is added to "ClipList.ini", in which information on the original image (a file name indicating the bitmapped image of the Web page from which the image is clipped and the URL of the Web page) and information on the clipped area (coordinates indicating the clip range; the coordinates determined in S155) are described (S160), and the clipping process is finished.

Figure 3B:
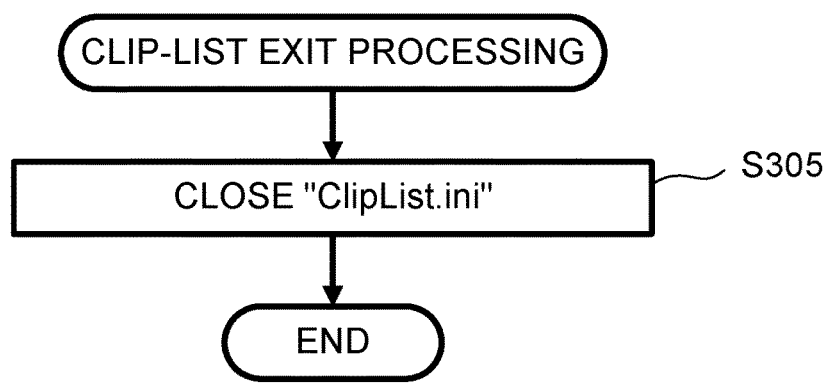
FIG. 3B is a flowchart illustrating an example clip-list exit processing.

Clip-list start processing and clip-list exit processing will be described with reference to FIG. 3. The clip-list start processing is executed when a clip list box on the web browser (the box at the left in FIG. 8A) is opened. The clip list box, in one example, includes a listing of clips previously stored. The clip-list exit processing is executed when the clip list box on the web browser is closed. Whether to open or close the clip list box may be designated through a user's operation while the web browser is opened.

If the clip list box is open when the web browser is closed, the clip-list exit processing is executed, and the status that the clip list box is open is dynamically stored. In this case, when the web browser is next opened, the clip list box is opened on the basis of the dynamically stored state, and the clip-list start processing is executed. In addition, the clip list box is updated by executing the clip-list start processing also directly after the clipping process (see FIG. 2) is executed.

When the clip-list start processing is started, the PC 1 searches the storage folder for "ClipList.ini" (S205). If "ClipList.ini" is not present (S210: NO), the PC 1 exits the clip-list start processing.

On the other hand, if "ClipList.ini" is present (S210: YES), the PC 1 opens "ClipList.ini" and displays the sections (S215). In S215, the information of "ClipList.ini" is read and is expanded to section-by-section information on the memory.

Next, the PC 1 determines whether an unprocessed section is present (S220) to process the displayed sections in S215 one by one. If an unprocessed section is present (S220: YES), the PC 1 acquires the section name, information on the original image (a file name indicating the bitmapped image of the Web page from which the image is clipped), and information on the clipped area (coordinates indicating the clip range) from the section to be processed (S225).

Subsequently, the PC 1 searches the storage folder for the acquired information on the original image and determines whether the original image is present (S230). The original image is generally present unless exceptional trouble occurs (S235: YES), in which case the PC 1 clips a thumbnail on the basis of the acquired information on the clipped area (S240) and displays the thumbnail in the clip list box in a reduced size (S245). For example, the thumbnail may correspond to the clipped section or range of the web page or other document from which the clip was selected.

Figure 8C:
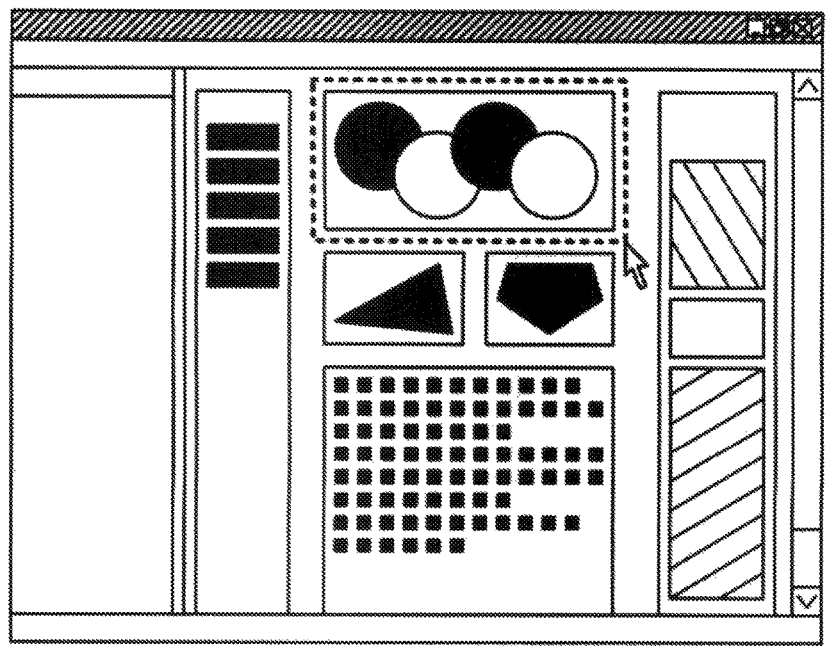
FIG. 8C is an explanatory diagram illustrating a state in which a clipped area is selected on the Web page displayed on the web browser.
Figure 8D:
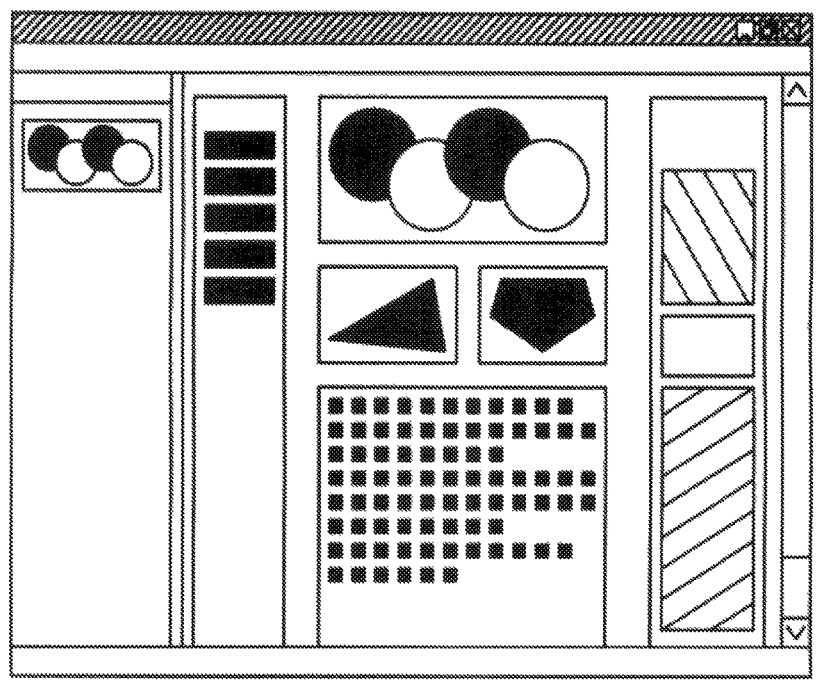
FIG. 8D is an explanatory diagram illustrating an example state in which the thumbnail of the selected clipped area is displayed in a clip list box.

As a result, the thumbnail is displayed in the clip list box on the web browser, as illustrated in FIG. 8D. The thumbnail illustrated in FIG. 8D is an example in which the clip range illustrated in FIG. 8C is designated, and the clip range is stored. After displaying such a thumbnail, the PC 1 stores the information on the clip (S250) and returns to S220.

In S230, if the original image is not present (S235: NO), an invalid section is generated in "ClipList.ini" for some reason, and thus, the PC 1 displays an error indication, deletes the section being processed from "ClipList.ini" (S255), and returns to S220.

From then on, S225 to S255 is repeated until all the sections displayed in S215 are processed. When all the listed sections have been processed in S215 (S220: NO), the PC 1 exits the clip-list start processing.

When the clip-list exit processing is started, the PC closes "ClipList.ini" (S305) and exits the clip-list exit processing.

Figure 8E:
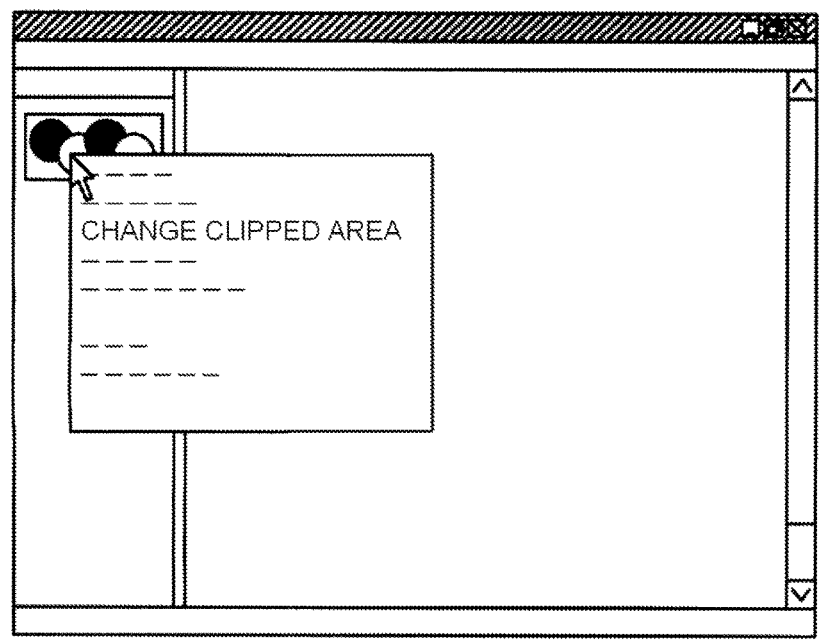
FIG. 8E is an explanatory diagram illustrating an example state in which a context menu is displayed by right-clicking on the thumbnail displayed in the clip list box.

Next, clipped-area change processing will be described with reference to FIG. 4. This processing is executed when the user initiates or causes the display of a context menu, as illustrated in FIG. 8E, in association with the thumbnail displayed in the clip list box through a right-click operation and selects "Change clipped area" from the menu.

When the clipped-area change processing is started, the PC 1 reads information on the target clip from the memory (S405), creates a new window (e.g., a clipped-area change screen) (S410), and displays the original image of the target clip at the center of the change screen (S415). For example, the original image may correspond to the stored image of the entire document or web page from which the clip was selected or designated. In some examples, instead of an original image, an original document (e.g., an HTML file) corresponding to the document or web page from which the clip was selected or designated may be used. Use of the stored document (e.g., either image or other type of file such as HTML or XML) may allow the user and PC 1 to avoid having to re-acquire the web page or document to process a clipped-area change.

The PC 1 converts the information on the clipped area of the processing target clip to information on the selected range on the change screen (S420), and displays the selected range on the change screen based on the stored information of the selected range on the change screen (S425).

Figure 8F:
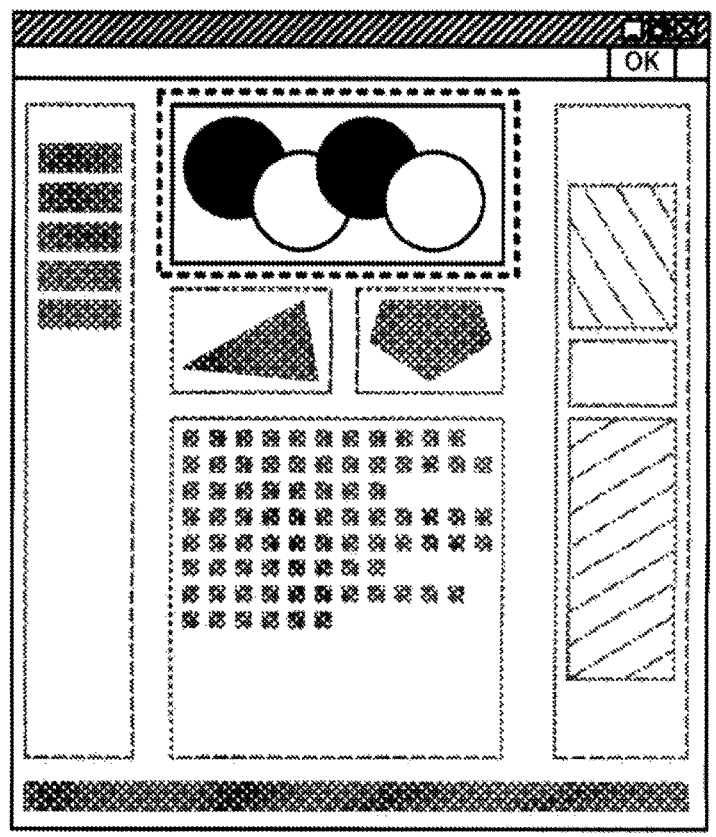
FIG. 8F is an explanatory diagram illustrating an example state in which the Web page from which the clip is cut is displayed on a clipped-area change screen.

At that time, an image or section of the document/web page in the selected range on the change screen is displayed in a normal tone, and images or sections outside the selected range are displayed in a color lighter than normal or in a translucent tone (see FIG. 8F). Other appearance variations and differences may be applied to differentiate between a selected range and a non-selected range of the original image/document.

Subsequently, the PC 1 executes identical-original-image-clip display processing (S430). The identical-original-image-clip display processing is executed, when the original image (e.g., an image of the entire Web page) or the downloaded original Web page itself including the clipped area to be processed includes a clipped area different from the processing target clip area, to display the other clipped area together on the change screen. S430 is illustrated in FIG. 5A.

When the identical-original-image-clip display processing is started, the PC 1 reads information on clips other than the clip to be changed (hereinafter referred to as a change target clip) from the memory (S505). In S505, if a plurality of clipped areas are clipped, information on all of the clips is read. In the step of S505, all the information is read irrespective of whether the information is of an area clipped from the same original image (e.g., the identical Web page).

Subsequently, the PC 1 determines whether unprocessed-clip information is present (S510). In S510, if no read information is present in S505, a negative determination is made (S510: NO), in which case, the identical-original-image-clip display processing is finished.

On the other hand, if unprocessed-clip information is present (S510: YES), the PC 1 determines whether the original image of the change target clip and the original image of the clip under determination are the same are the same (S515). In S515, if both the clip under determination and the change target clip are clipped from the same Web page, a positive determination is made. On other hand, if the clip under determination is clipped from another Web page different from the change target clip, a negative determination is made.

In S515, the PC 1 determines whether the clips are cut from the same Web page with reference to the URL included in the section in "ClipList.ini" (the URL described in "ClipList.ini" in S160).

If the processing target clip and the change target clip are clipped from the same original image (S515: YES), the PC 1 converts the information on the clipped area of the processing target clip to information on the selected range on the change screen (S520). The PC 1 displays the selected range on the change screen in a different color from that of the change target clip based on the information on the selected range on the change screen (S525) and returns to S510. In S525, in addition to the selected range to be changed, the selected range indicating another clipped area different from the change target clip is displayed in a different color on the change screen.

In S515, if the processing target clip and the change target clip are clipped from different original images (S515: NO), the selected range of the unprocessed clip is not additionally displayed, and thus, the PC 1 returns to S510 without executing S520 and S525.

While unprocessed-clip information is present, S515 to S525 is repeated. In S510, if it is determined that unprocessed-clip information is not present (S510: NO), the identical-original-image-clip display processing is finished.

Figure 4:
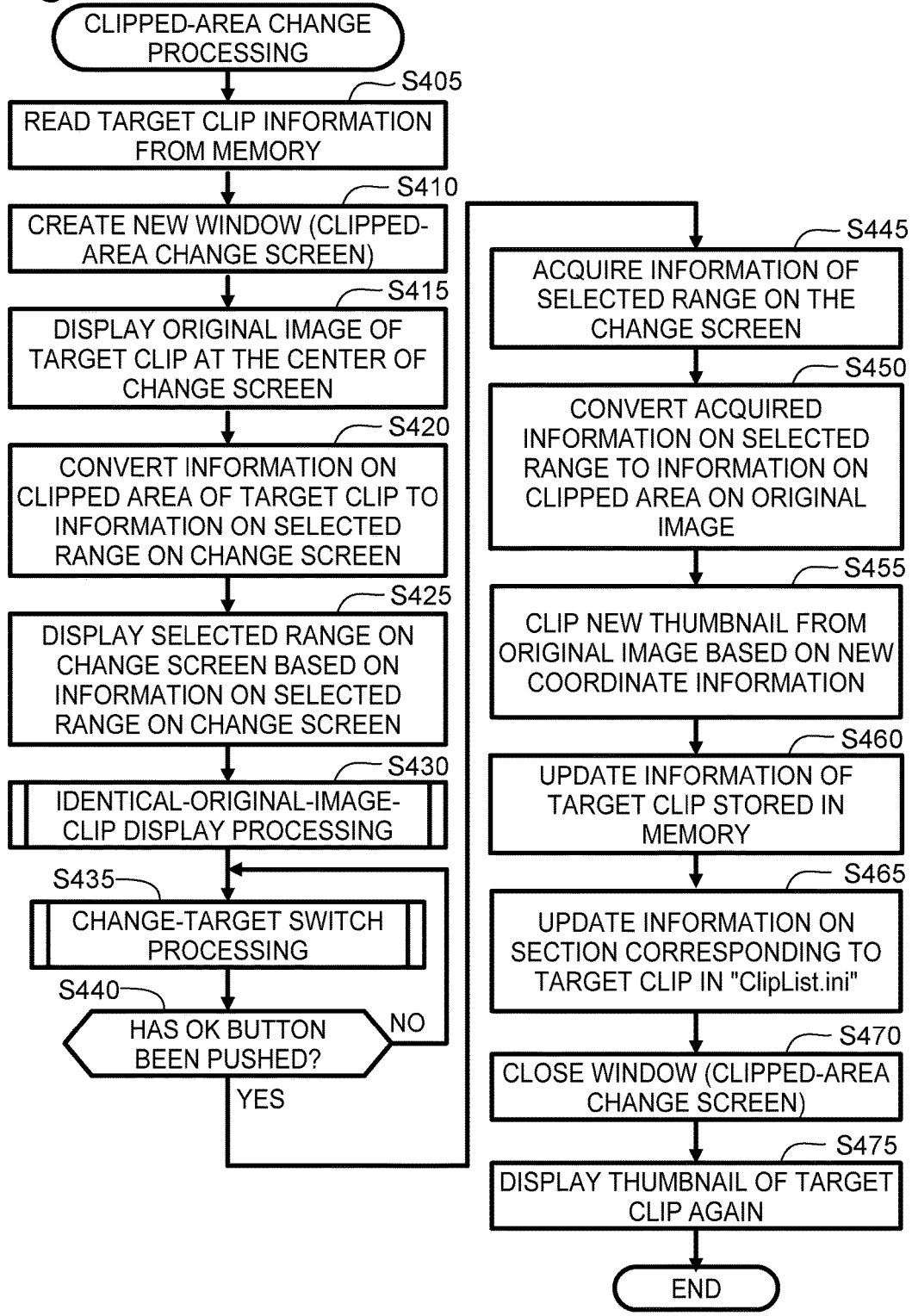
FIG. 4 is a flowchart illustrating an example clipped-area change processing.
Figure 5B:
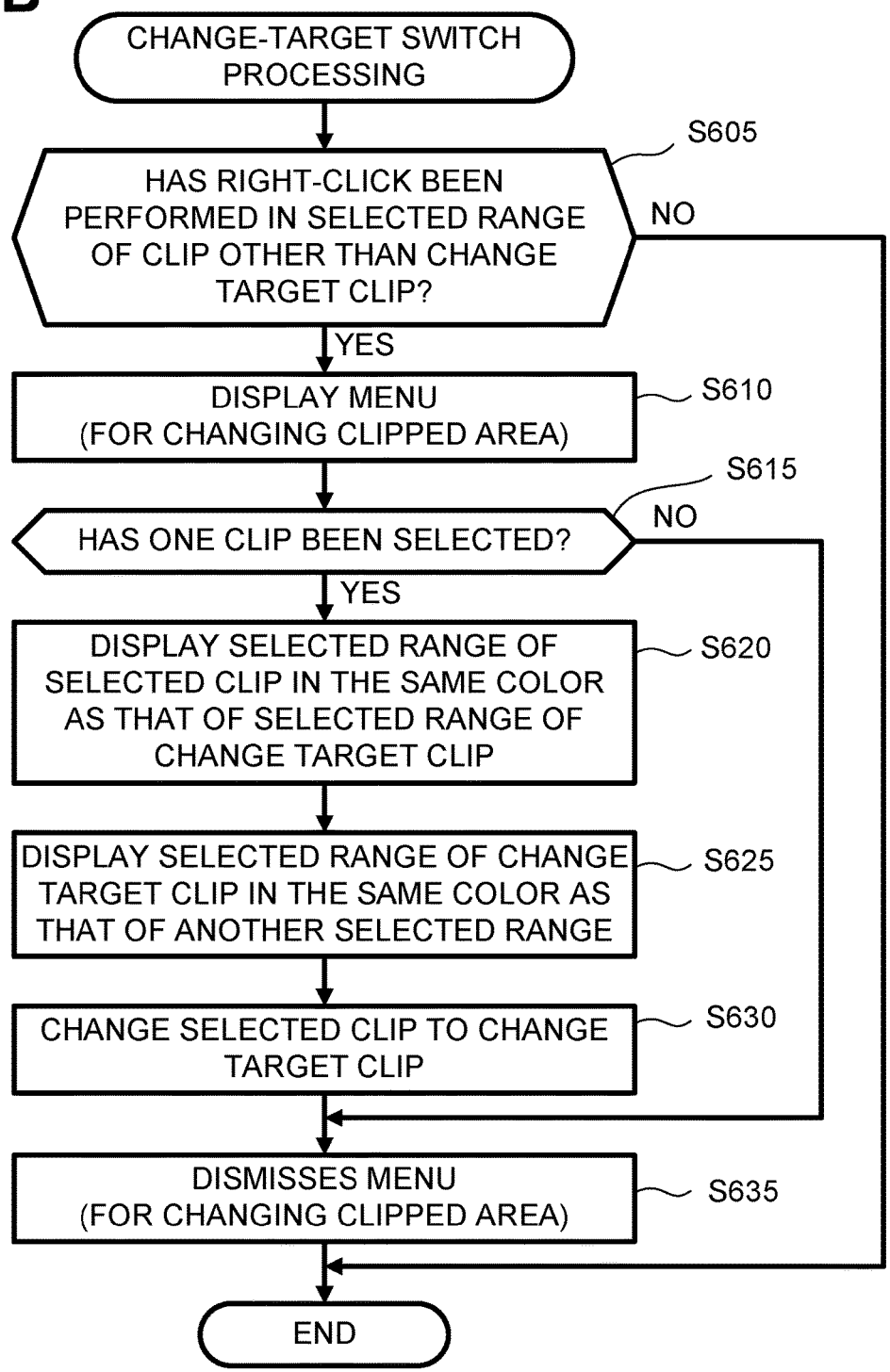
FIG. 5B is a flowchart illustrating an example change-target switch processing.

After exiting the identical-original-image-clip display processing, the PC 1 moves to S435 in FIG. 4, at which the PC 1 executes change-target switch processing (S435). The change-target switch processing is executed, when another clipped area is present in S430, to switch the change target clipped area to another clipped area. S435 is illustrated in FIG. 5B.

When the change-target switch processing is started, the PC 1 determines whether a right-click has been performed in the selected range of the clip other than the change target clip (S605). If a right-click has not been performed (S605: NO), the change-target switch processing is finished.

On the other hand, if a right-click has been performed (S605: YES), the PC 1 displays a context menu (for changing the clipped area) (S610). If one clip is selected (S615: YES), the PC 1 displays the selected range of the selected clip in the same color as that of the selected range of the change target clip (S620). Additionally, the display color of the selected range of the change target clip may be changed to be the same as that of selected ranges of a clip that are not to be changed (S625).

The PC 1 changes the change target clip to the selected clip (S630) and moves to S635. Also when no clip is selected from the menu displayed in S610 (S615: NO), the PC 1 moves to S635. In S635, the PC 1 dismisses the menu (for changing the clipped area) (S635) and exits the change-target switch processing.

After exiting the change-target switch processing in this way, the PC 1 moves to S440 in FIG. 4, in which if an OK button (not illustrated) serving as a change confirmation button has not been pushed (S440: NO), the PC 1 returns to S435. In other words, the PC 1 accepts a target switch instruction any number of times until the OK button is pushed.

In S440, the PC 1 also accepts the operation of changing the range of a clipped area, in addition to the OK-button pushing operation. The operation of changing the range of a clipped area is the operation of expanding a frame indicating the selected range, as indicated by the broken line in FIG. 8F, by dragging the frame in the direction indicated by an arrow in FIG. 9A. The frame can also be scaled down by executing a similar drag operation, or alternatively, the frame can be scaled up or down also by dragging a corner of the frame. Alternatively or additionally, the currently selected size and/or shape of the range might not be changed, and instead be moved around to different portions of the original image.

On the other hand, a determination in S440 that the OK button has been pushed (S440: YES), may indicate that the operation of confirming the change in the clipped area has been performed, and thus, the PC 1 may acquire information on the selected range on the change screen (S445) and convert the acquired information on the selected range to information on a clipped area on the original image (S450) in response thereto.

The PC 1 clips a new thumbnail from the original image on the basis of the new coordinate/range information (S455), updates the information of the processing target clip stored in the memory (S460), and updates the information in the section corresponding to the processing target clip in "ClipList.ini" (S465). That is, the PC 1 updates the information of the clipped area in the section (coordinates indicating the clip range).

Figure 9A:
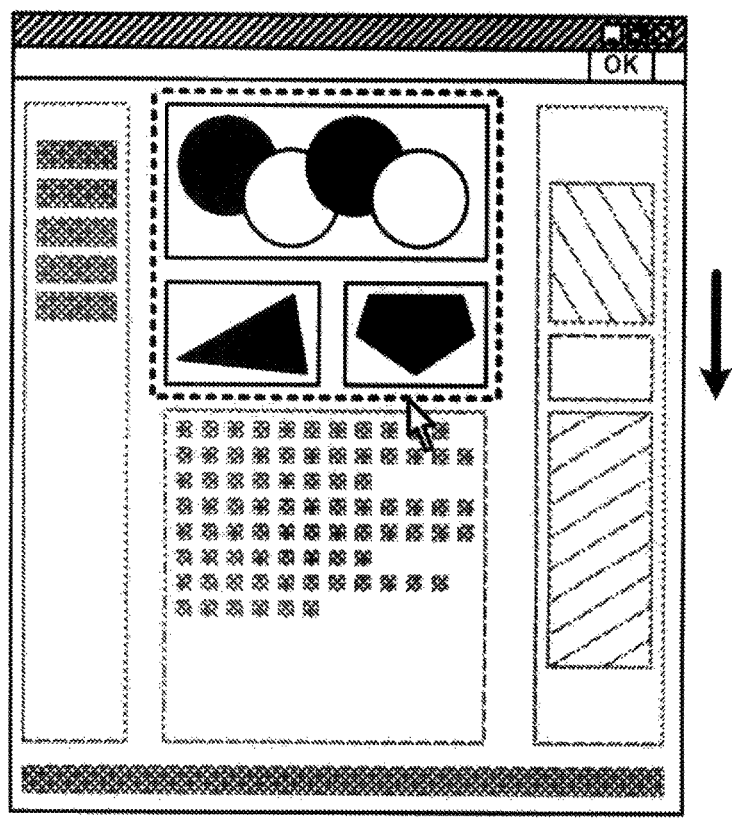
FIG. 9A is an explanatory diagram illustrating an example state in which the operation of expanding the clipped area downwards on the clipped-area change screen is performed.
Figure 9B:
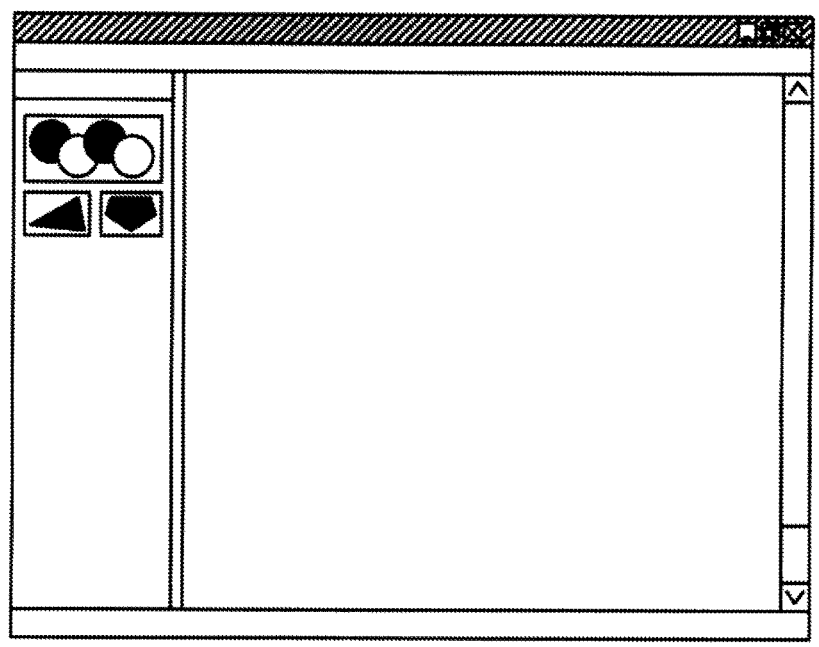
FIG. 9B is an explanatory diagram illustrating an example state in which the thumbnail of the expanded clipped area is displayed in the clip list box.

Thereafter, the PC 1 closes the window (clipped-area change screen) (S470), displays the thumbnail of the processing target clip again (S475), and exits the clipped-area change processing. As a result of execution of S475, as illustrated in FIG. 9B, the thumbnail of the clipped area whose range is changed, as illustrated in FIG. 9A, is displayed in the clip list box.

Figure 9C:
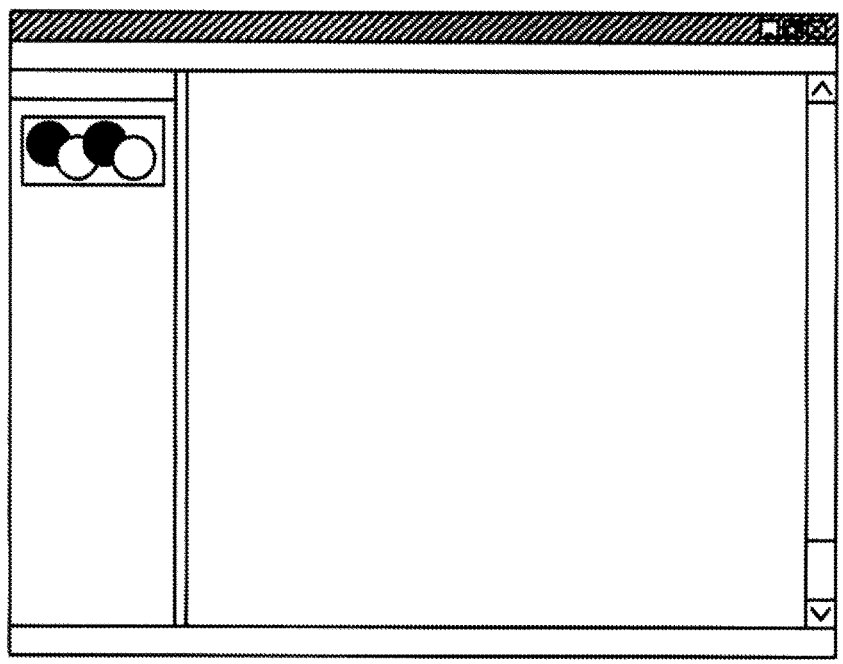
FIG. 9C is an explanatory diagram illustrating the display state of the web browser directly before a print preview is performed.

Next, preview processing will be described with reference to FIG. 6. This processing is executed when the user issues an instruction to display a print preview through a predetermined operation. The print preview is displayed to allow the user, when one or more clips registered in the clip list (for example, the clip illustrated in FIG. 9C) are printed on a recording medium, to check, on the screen, the position and size thereof on the recording medium.

When the preview processing is started, the PC 1 first reads information on the clips to be previewed from the memory (S705) and creates a new window (preview screen) (S710).

Subsequently, the PC 1 determines whether an unprocessed clip to be previewed is present to process all the clips to be previewed (S715). If an unprocessed clip is present (S715: YES), the PC 1 displays the thumbnail image left-aligned on the preview screen (S720), copies the information on the processing target clip to a memory for a preview (S725), and returns to S715.

Figure 9D:
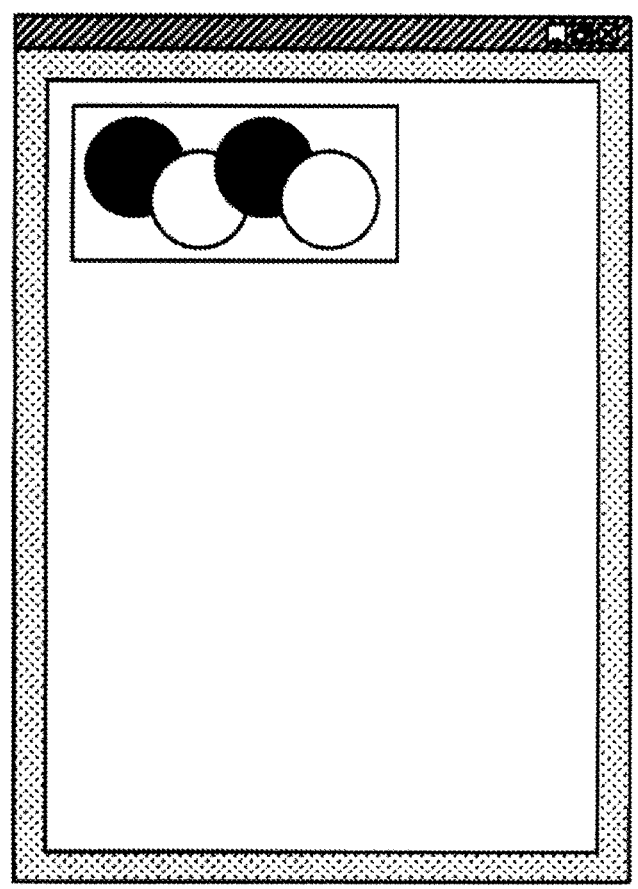
FIG. 9D is an explanatory diagram illustrating an example print preview screen.

By repeating S715 to S725 in this way, the thumbnail image is displayed left-aligned on the window serving as a preview screen, as illustrated in FIG. 9D. FIG. 9D illustrates only one thumbnail image; when two or more thumbnail images are displayed, all the thumbnail images may be left-aligned in the vertical direction in this embodiment.

Whether to left-align the thumbnail images is optional; for example, all the thumbnail images may either be aligned at the center or may be right-aligned. Alternatively, if a sufficient blank space remains on the right as a result of left-alignment, the next image may be rendered to the right of the preceding image in consideration of the size of the blank and the size of the next image. Furthermore, the user may select any of the alignments or store the selection as setting and align the thumbnail images according to the setting.

The thumbnail images on the preview screen are rendered on the preview screen, with each image inside the outer frame displayed on the preview screen as an image corresponding to the recording medium, in a size that reflects the scale of an image corresponding to the recording medium and the actual recording medium. This allows the user to check the position and size of the clip image to be printed on the recording medium while viewing the preview screen.

As a result of the foregoing processing, if it is determined that an unprocessed clip is not present in S715 (S715: NO), then the PC 1 determines whether one thumbnail has been right-clicked on the preview screen (S730). If one thumbnail has been right-clicked (S730: YES), the PC 1 executes preview-area change processing (S735). The process in S735 is specifically illustrated in FIG. 7.

When the preview-area change processing is started, the PC 1 displays a selected range around the target right-clicked thumbnail (S805). Any other previewed clips or thumbnails may be hidden during this processing. The PC 1 acquires the display position of the target thumbnail on the preview screen (S810), acquires information on the target thumbnail from the memory for preview (S815), and determines the display position of the original image from the target thumbnail display position and the information on the clipped area (S820).

The display position of the original image (an image on the Web page from which the target thumbnail is clipped) is determined in S820 such that the target-thumbnail display position on the preview screen is fixed, and an area on the original image in the periphery of the clip range is disposed around the thumbnail with reference to the thumbnail position. In some cases, portions of the original image may fall outside of the boundaries of the recording medium and thus, might not be shown initially.

Figure 9E:
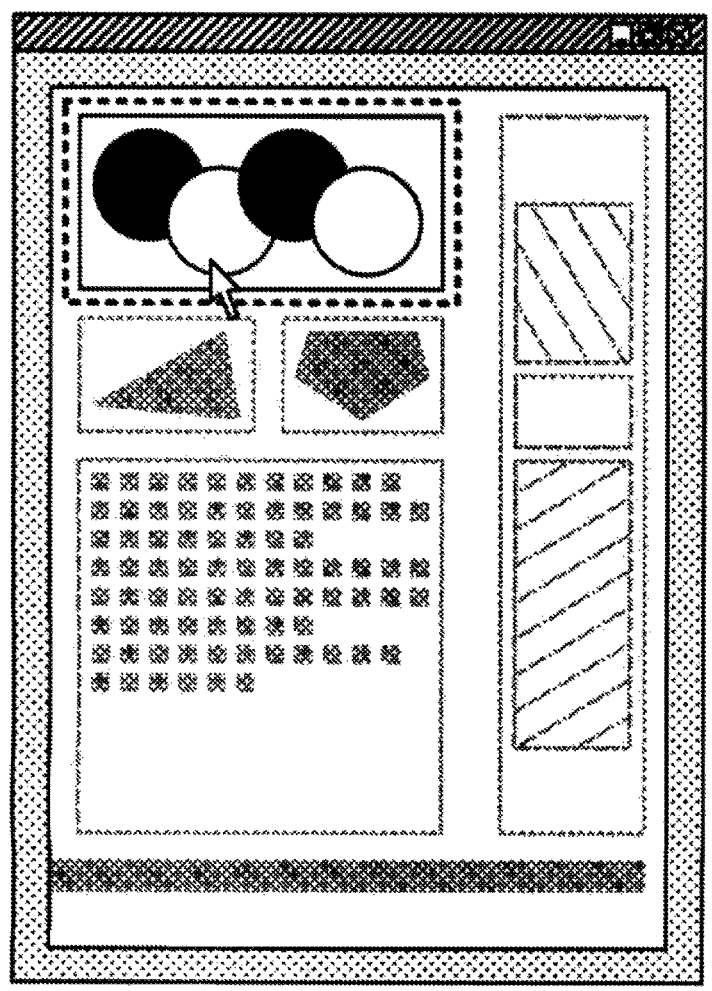
FIG. 9E is an explanatory diagram illustrating an example state in which a change of the range of the clipped area is started on the print preview screen.

After the display position has been determined, the PC 1 displays the original image translucently on the back of the target thumbnail (S825). In S825, the part of the original image (see FIG. 8B) other than the clipped area is rendered in the periphery of the thumbnail, illustrated in FIG. 9D, on the preview screen, with the thumbnail display position fixed, as illustrated in FIG. 9E.

Subsequently, the PC 1 determines whether the user has released the mouse button (that is, a mouse-up operation has been performed) (S830). If the mouse button has not been released (S830: NO), the PC 1 determines whether the mouse has moved (S835). If the mouse has not moved (S835: NO), the PC 1 returns to S830, and repeats S830 to S835.

On the other hand, if the mouse has moved in S835 (S835: YES), the PC 1 acquires the moving distance of the mouse (S840) and determines whether the mouse has been dragged in the selected range (S845) and whether the mouse has been dragged in the periphery of the selected range (S850) in sequence. If the mouse has not been dragged in the selected range (S845: NO) and has not been dragged in the periphery of the selected range (S850: NO), the PC 1 returns to S830.

On the other hand, if the mouse has been dragged in the selected range (S845: YES), the PC 1 changes the original-image display position by a length or distance corresponding to the acquired moving distance (S855) and displays the original image translucently again on the back of the target thumbnail (S860). For example, the original-image display position may shift around on the recording medium. While the original image display position is modified, the selected range may remain fixed in position relative to the recording medium. The PC 1 changes the information on the clipped area corresponding to the acquired moving distance (S865), creates a new thumbnail from the original image on the basis of the changed clipped area information (S870), deletes the present thumbnail and displays the new thumbnail (S875), and returns to S830. Thus, the dragging of the mouse in the selected range may correspond to a movement of the original image display position (e.g., rather than movement or resizing/reshaping of the clipped area range).

Figure 9F:
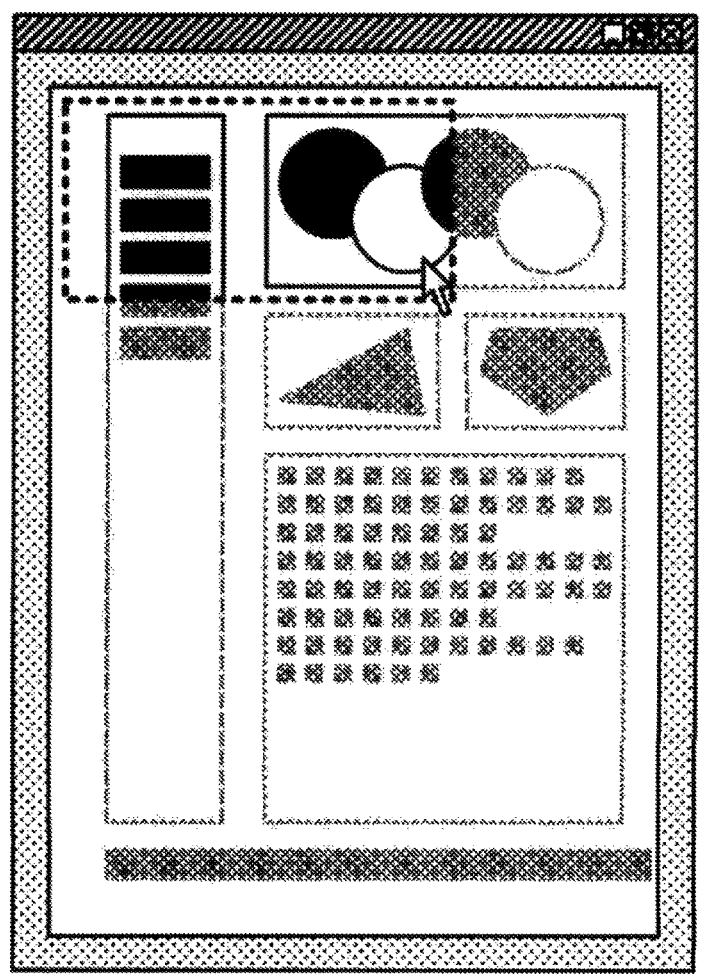
FIG. 9F is an explanatory diagram illustrating an example state in which the inside of the clipped area is dragged on the print preview screen.

By the processing from S855 to S875, the original image and the thumbnail are displayed at a position shifted in a predetermined direction by a length corresponding to the moving distance of the mouse (by the moving distance and in the direction indicated by the arrow in FIG. 9F), as illustrated in FIG. 9F. The processing from S855 to S875 is repeated while the mouse is dragged.

Figure 10A:
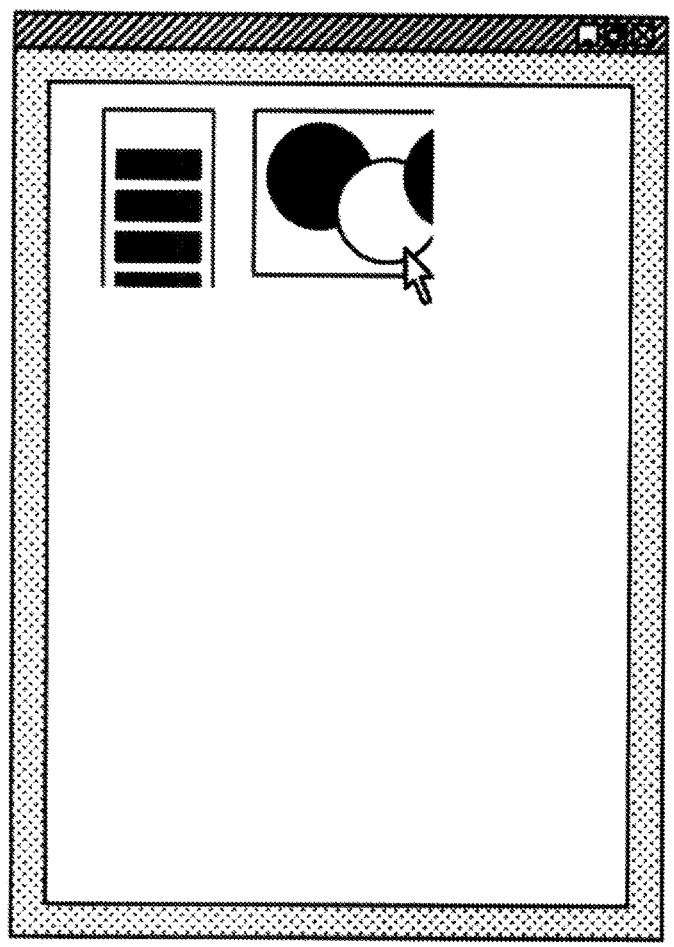
FIG. 10A is an explanatory diagram illustrating an example state in which after the inside of the clipped area is dragged on the print preview screen, the changed clipped area is confirmed.

On the other hand, when the user releases the mouse button after such a drag operation is performed, a positive determination is made in S830 (S830: YES). In this case, the PC 1 dismisses the original image from the preview screen (S880), dismisses the selected range around the target thumbnail (S885), and exits the preview-area change processing. As a result, the original image and the selected range around the thumbnail on the preview screen disappear, as illustrated in FIG. 10A, into a state in which only a clip whose clip position is updated is displayed. In some arrangements, the changing of the clipped area information, deletion of the previous thumbnail and display of the new thumbnail (e.g., S865-S875 might not be performed until the user releases the mouse button (S830: YES).

Figure 6:
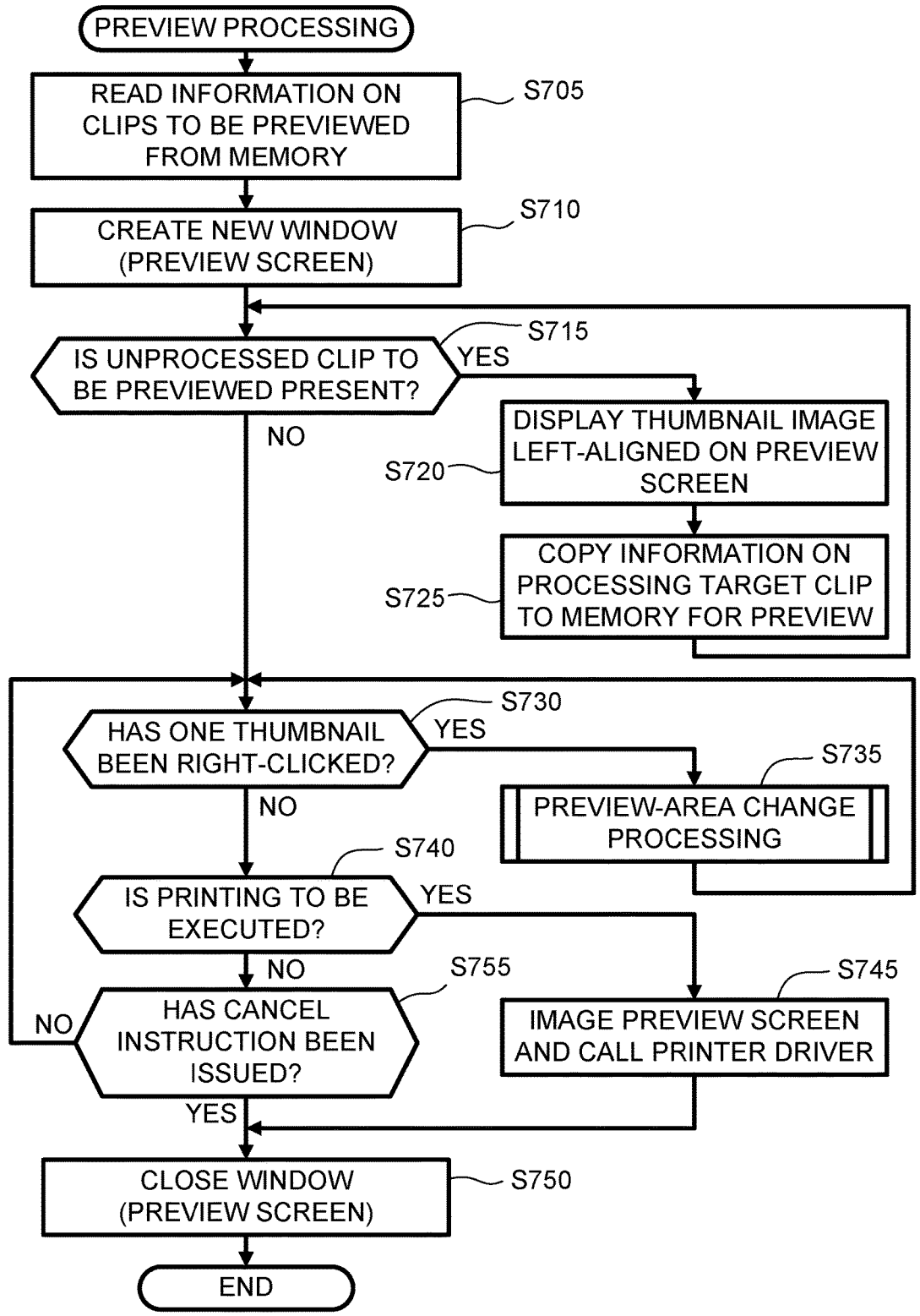
FIG. 6 is a flowchart illustrating an example preview processing.

When the preview-area change processing is finished, the PC 1 returns to S730 in FIG. 6. The following description will be given on the assumption that one thumbnail is right-clicked. When one thumbnail is right-clicked, a positive determination is made in S730, and the PC 1 executes the preview-area change processing described above (S735).

Figure 7:
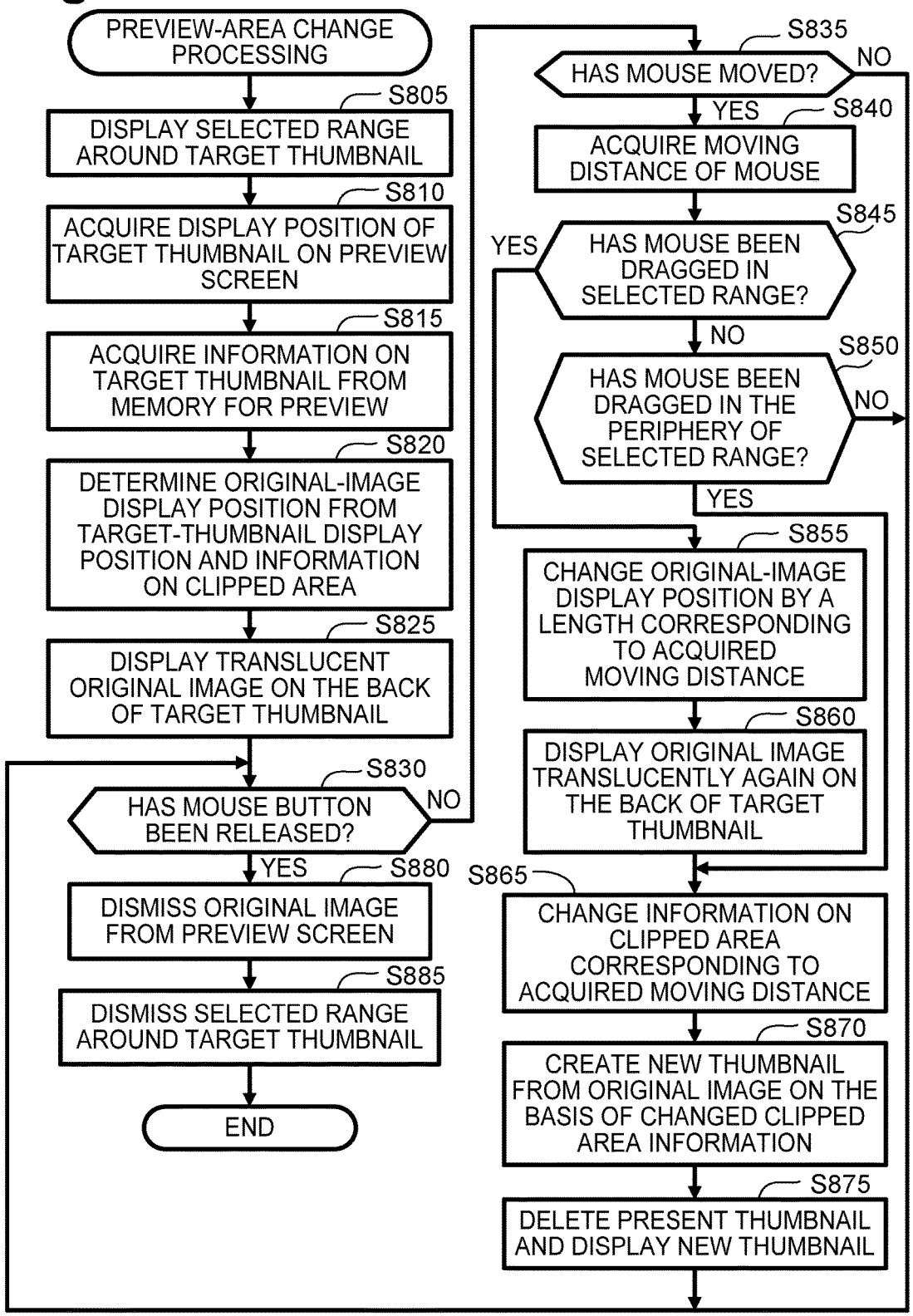
FIG. 7 is a flowchart illustrating an example preview-area change processing.
Figure 10B:
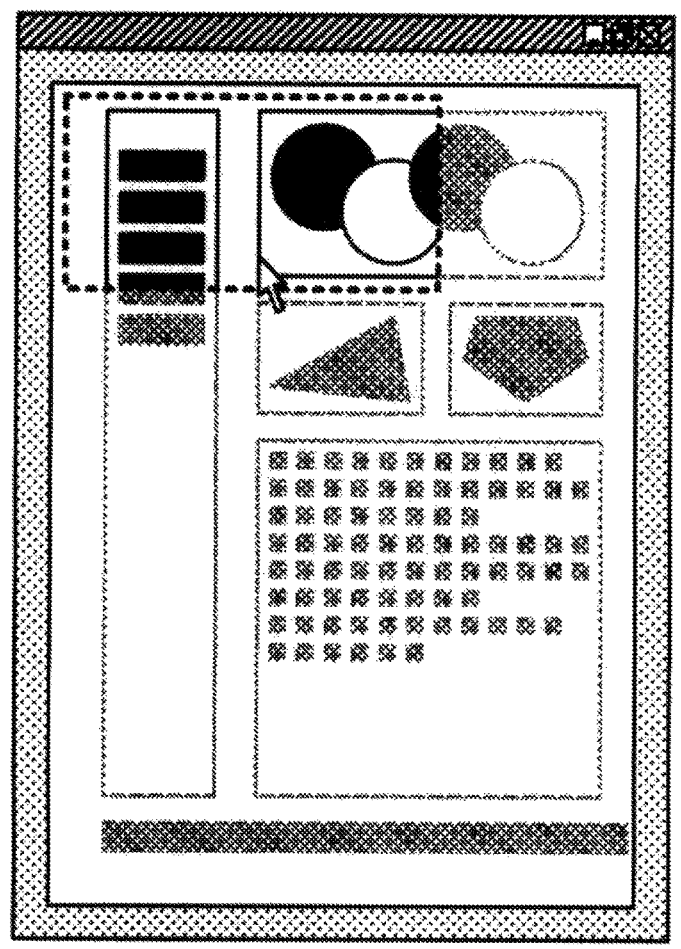
FIG. 10B is an explanatory diagram illustrating an example state in which a change of the range of the clipped area is started on the print preview screen.

When S805 to S825 in FIG. 7 is executed, the original image is translucently displayed again in the periphery of the thumbnail illustrated in FIG. 10A, as illustrated in FIG. 10B. In this state, the PC 1 repeats S830 to S835 described above.

At that time, when the user drags the periphery of the selected range with a mouse (S850: YES), the PC 1 changes the information on the clipped area corresponding to the acquired moving distance (S865), creates a new thumbnail from the original image on the basis of the changed clipped area information (S870), deletes the present thumbnail and displays the new thumbnail (S875), and returns to S830.

Figure 10C:
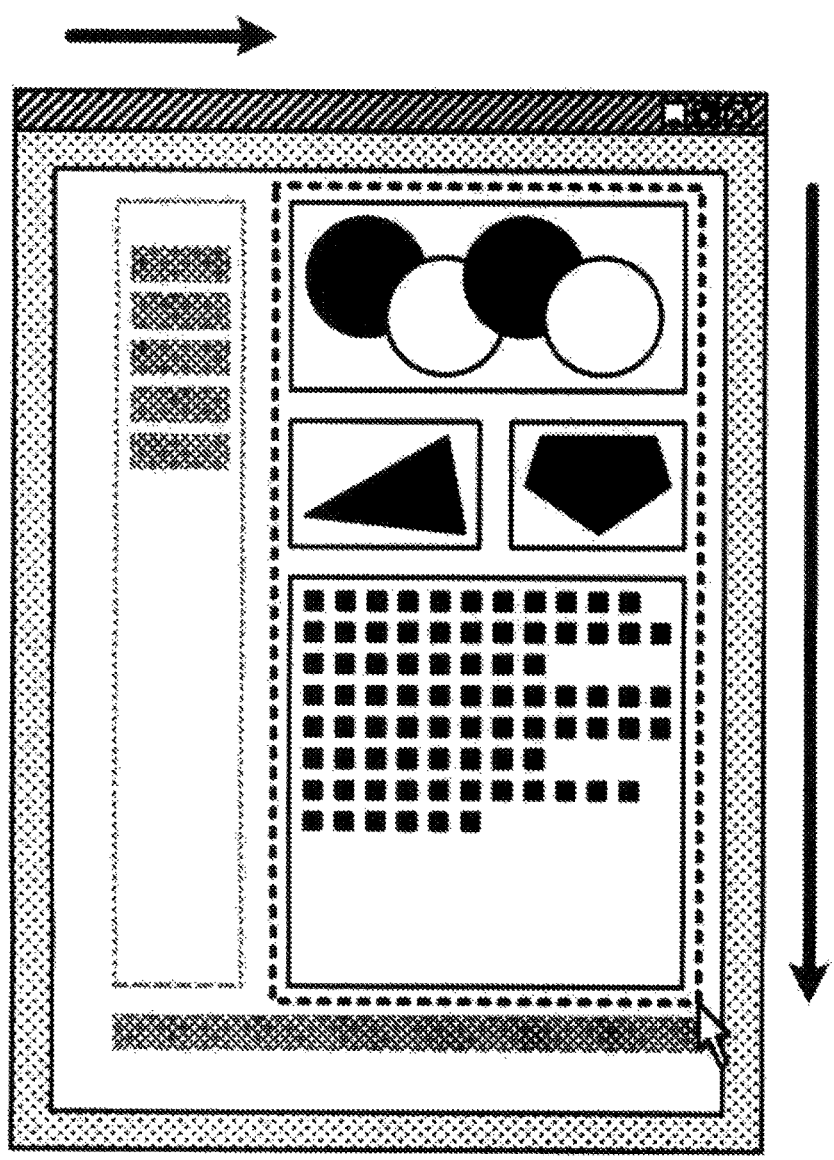
FIG. 10C is an explanatory diagram illustrating an example state in which the periphery of the clipped area is dragged on the print preview screen.

By the processing from S865 to S875, the selected range around the thumbnail moves in a predetermined direction by a length corresponding to the moving distance of the mouse (by the moving distance and in the direction indicated by the arrow in FIG. 10C), as illustrated in FIG. 10C. An image in the selected range is rendered again as a new thumbnail. Thus, the dragging of the periphery of the selected range may correspond to a modification in the size, shape and/or location (relative to the recording medium) of the selected range.

When the user releases the mouse button after such a drag operation is performed, a positive determination is made in S830 (S830: YES). The PC 1 therefore dismisses the original image from the preview screen (S880), dismisses the selected range around the target thumbnail (S885), and exits the preview-area change processing.

Figure 10D:
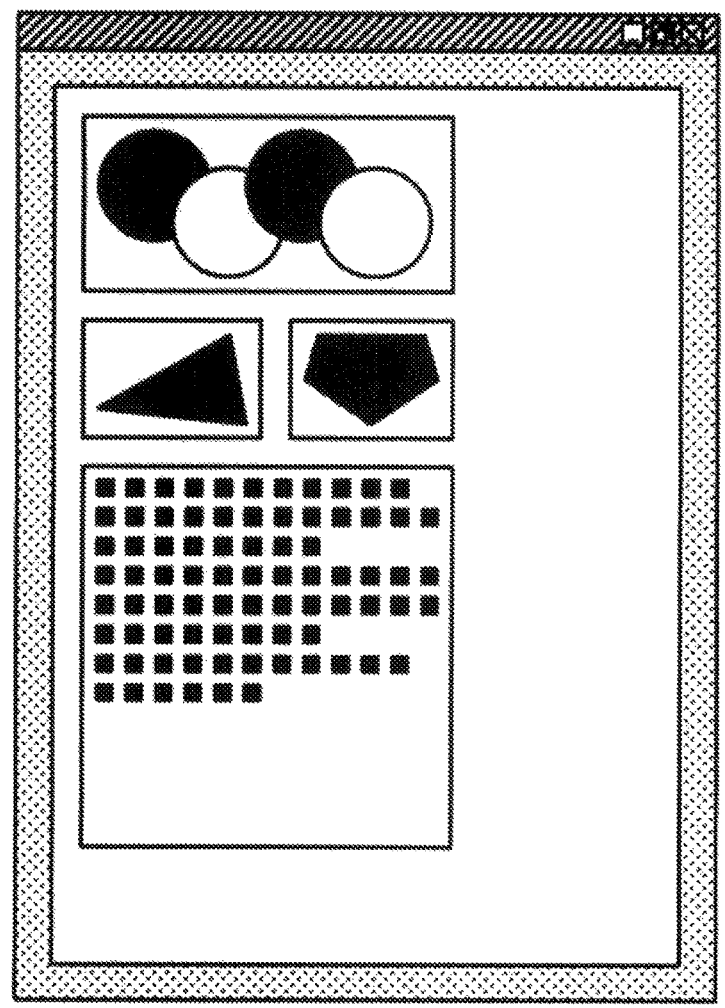
FIG. 10D is an explanatory diagram illustrating an example state in which after the periphery of the clipped area is dragged on the print preview screen, the changed clipped area is confirmed.

In this embodiment, a clip is printed left-aligned, and a thumbnail on the preview screen is also left-aligned. Thus, if a space exists to the left of the thumbnail as the selected range is changed as described above, the process of moving the thumbnail to the left by a length corresponding to the space is also performed in S885. As a result, the original image and the selected range around the thumbnail disappear on the preview screen into a state in which only a clip whose clip position is updated is displayed, as illustrated in FIG. 10D.

After the preview-area change processing is finished, and the PC 1 returns to S730 in FIG. 6, if one thumbnail has not been right-clicked on the preview screen (S730: NO), the PC 1 determines whether to perform printing (S740).

Figure 10E:
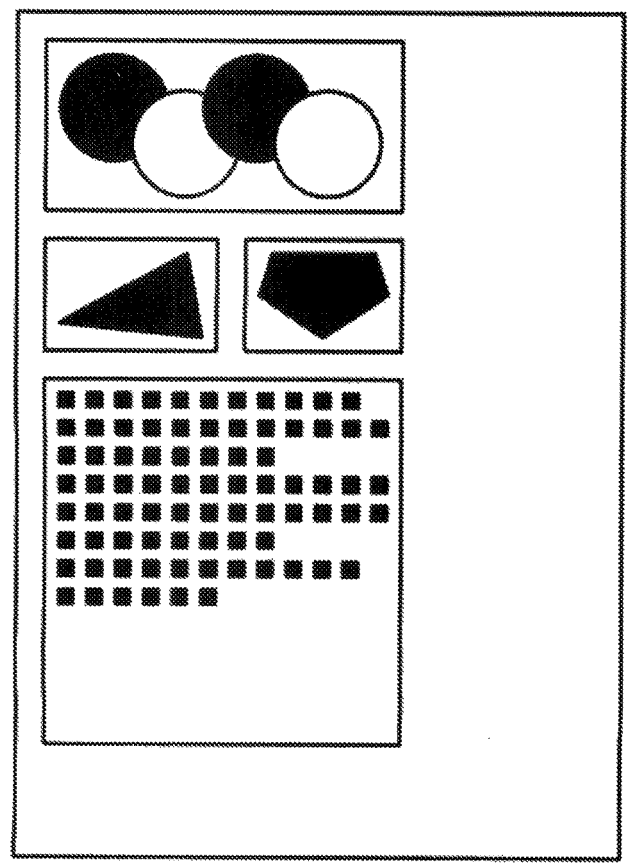
FIG. 10E is an explanatory diagram illustrating an example state in which the clipped area confirmed on the print preview screen is printed.

If the user has performed the operation of issuing a print instruction (S740: YES), the PC 1 images the preview screen and call a printer driver (S745). As a result, a print image, as illustrated in FIG. 10E, is printed by the printer 3. After S745 is finished, the PC 1 closes the window (preview screen) (S750) and exits the preview processing.

On the other hand, if it is determined in S740 that printing is not to be performed (S740: NO), the PC 1 determines whether to make a cancellation (S755). If the user has performed the operation of issuing a cancel instruction (S755: YES), the PC 1 closes the window (preview screen) (S750) and exits the preview processing. If a cancellation is not performed (S755: NO), the PC 1 returns to S730.

As described above, with the PC 1 that executes the foregoing processing, in the case where the user wants to clip an area from a Web page and thereafter change the clip range, the user can change the clip range with a remarkably simple operation.

Thus, the user need not to perform troublesome operations, such as reopening a Web page or other document from which an image is clipped and reselecting a clip range. Furthermore, even if the user forgets, in future, a Web page from which the image is clipped, the clip range can be changed without problems.

Furthermore, even if desired information disappears because a source Web page is deleted from the network or the content of the source Web page is updated, the clip range can be changed without problems.

While an embodiment of the present disclosure has been described above, the present disclosure is not limited to the specific embodiment, and various other features may be included or excluded.

For example, in the above embodiment, in the case where a plurality of clips cut out from the same original image are present, selected ranges of the clips are displayed on the change screen in S430 illustrated in FIG. 4 (specifically, S505 to S525 illustrated in FIG. 5A); however, whether to perform such display is optional. That is, only a selected range to be changed may be displayed, and the other selected ranges need not be displayed.

Furthermore, in the case where selected ranges of a plurality of clips are displayed on the change screen, whether to enable a selected range to be changed to be switched to another range in S435 of FIG. 4 (specifically, S605 to S635 in FIG. 5B) is optional. For example, it is also possible that selected ranges of a plurality of clips are displayed on the change screen in S430 of FIG. 4 (specifically, S505 to S525 in FIG. 5A), but a selected range to be changed cannot be switched to another.

In addition, the embodiment illustrates an example in which a program for the PC 1 to execute the processes is installed as a plug-in in a web browser; alternatively, the browser itself may have the function of executing the processes.

Although the embodiment illustrates an example in which the PC 1 and the printer 3 are separate unit, an all-in-one unit in which a user interface corresponding to the PC 1 is installed in equipment corresponding to the printer 3 may have the configuration of the present invention.

In the embodiment described above, the PC 1 or the CPU 11 corresponds to an example of the computer in the present invention. The CPU 11 that executes S105 corresponds to an example of the selection-instruction receiving unit in the present invention. The CPU 11 that executes S110 to S160 corresponds to an example of the storage control unit in the present invention. The CPU 11 that executed S405 to S415 or S705 to S725 corresponds to an example of the selected-image display unit in the present invention. The CPU 11 that executes S420 to S440 and S730 to S735 corresponds to an example of the change-instruction receiving unit in the present invention. The CPU 11 that executes S415 and S825 corresponds to an example of the peripheral-image display unit in the present invention. The CPU 11 that executes S465 and S865 corresponds to an example of the selection-area-information update unit in the present invention.

What is claimed is:

1. A non-transitory, computer-readable medium storing computer-readable instructions executable by a computer of an apparatus, the apparatus comprising the computer, an operation unit, a display unit, and a memory, the instructions, when executed by the computer, cause the apparatus to:
   execute a web browser;
   accept a first user operation via the operation unit, when a web page is displayed by the web browser on the display unit, the first user operation selecting a first range defining a first area on the displayed web page, the web browser configured to: receive web page data, generate a web page based on the received web page data, and display the web page on the display unit;
   in response to the first user operation:
      extract a selected image from the displayed web page, the selected image being an image displayed in the first area;
      display the selected image in a selected image display area on the display unit;
      store document data in the memory, the document data identifying the displayed web page and the first area;
      accept a second user operation via the operation unit, the second user operation designating an image from the selected image display area;
      in response to the second user operation, display, on the display unit, the web page identified by the document data, and the first area;
      accept a third user operation via the operation unit, the third user operation including an instruction to access the first area and change the first range of the first area to a second range;
      in response to the third user operation, generate second range information indicating the second range;

replace the first range with the second range, including replacing stored first range information with generated second range information; and visually replace the range of the first area in the web page identified by the document data, based on the replacement of the first range with the second range.

2. The non-transitory, computer-readable medium according to claim 1, wherein the apparatus is further caused to:
in response to the second user operation, display the web page indicated by the document data on the display unit, the web page including the first area and another area, a range of the first area being the first range, the first area being displayed in a first visual condition, and the other area being displayed in a second visual condition.

3. The non-transitory, computer-readable medium according to claim 1, wherein the apparatus is further caused to:
in response to the third user operation, replace a visual condition of the selected image in the selected image display area, from a condition corresponding to the first range with a condition corresponding to the second range.

4. The non-transitory, computer-readable medium according to claim 1, wherein the apparatus is further caused to:
in response to the third user operation, display an entirety of the web page designated by the document data based on the document data.

5. The non-transitory, computer-readable medium according to claim 4, wherein the apparatus is further caused to:
when information for a third range and the document data are stored in the memory in association with each other, in response to the first user operation, generate the first range information, the third range information indicating a range of a second area, the second area being different from the first area, and the second area being predesignated by a fourth user operation;
store the generated first range information in the memory in association with the document data stored in the memory; and
when the first range information, the third range information and the document data are stored in the memory in association with each other, and in response to the second user operation, display the web page designated by the document data on the display unit, the web page including the first area, the second area and a third area, wherein the range of the first area is the first range, wherein the range of the second area is the third range, and wherein the first area is displayed in a first visual condition, the third area is displayed in a second visual condition, and the second area is displayed in a third visual condition.

6. The non-transitory, computer-readable medium according to claim 5, wherein the apparatus is further caused to:
accept a fifth user operation via the operation unit, the fifth user operation including an instruction to display a print preview;
in response to the fifth user operation, read the first range information and the third range information from the memory; and
display the print preview based on the first range information and the third range information, the print preview indicating an entire recording medium on which the first area and the third area are to be printed.

7. The non-transitory, computer-readable medium according to claim 1,
wherein the third user operation is an operation to expand or reduce the first range, and wherein second range is an expanded range or a reduced range compared to the first range.

8. The non-transitory, computer-readable medium according to claim 1, wherein the apparatus is further caused to:
accept a sixth user operation via the operation unit, the sixth user operation designating whether or not to display the selected image display area;
in response to the sixth user operation designating to display the selected image display area, display the selected image display area on the display unit;
in response to the sixth user operation designating to not display the selected image display area, delete the selected image display area from the display unit, and, when the web browser is terminated, delete the selected image display area from the display unit;
after the web browser, with the selected image display area displayed, is terminated, and in response to activation of the web browser, display the selected image display area on the display unit, without requiring the sixth user operation; and
after the web browser, with the selected image display area not displayed, is terminated:
in response to activation of the web browser, display the web browser without the selected image display area, and
after activation of the web browser, and in response to the sixth user operation, display the selected image display area on the display unit.

9. The non-transitory, computer-readable medium according to claim 8, wherein the document data is a Uniform Resource Location (URL) of the web page data.

10. The non-transitory, computer-readable medium according to claim 9, wherein the apparatus further caused to:
store the URL and image data indicating the web page in the memory, in association with each other; and
in response to the second user operation, display the web page designated by the document data based on the image data, on the display unit.

11. An apparatus comprising:
a display;
an input device;
a processor; and
memory storing computer readable instructions that, when executed, cause the apparatus to:
execute a web browser;
accept a first user operation via the input device, when a web page is displayed by the web browser on the display, the first user operation selecting a first range defining a first area on the displayed web page, the web browser configured to: receive web page data, generate a web page based on the received web page data, and display the web page on the display;
in response to the first user operation:
extract a selected image from the displayed web page, the selected image being an image displayed in the first area;
display the selected image in a selected image display area on the display; and
store document data in the memory, the document data identifying the displayed web page and the first area;
accept a second user operation via the input device, the second user operation designating an image from the selected image display area;

in response to the second user operation, display, on the display, the web page identified by the document data, and the first area;

accept a third user operation via the input device, the third user operation including an instruction to access the first area and change the first range of the first area to a second range;

in response to the third user operation, generate second range information indicating the second range;

replace the first range with the second range, including replacing stored first range information with generated second range information; and visually replace the range of the first area in the web page identified by the document data, based on the replacement of the first range with the second range.

* * * * *